Nov. 3, 1953 J. M. SHERMAN ET AL 2,658,103

TELEVISION APPARATUS

Filed April 6, 1951 3 Sheets-Sheet 1

Inventors
JOHN M. SHERMAN
AND
EDWILL FISHER

By Caswell & Lagaard
ATTORNEYS

Nov. 3, 1953 J. M. SHERMAN ET AL 2,658,103

TELEVISION APPARATUS

Filed April 6, 1951 3 Sheets-Sheet 2

Inventors
JOHN M. SHERMAN
AND
EDWILL FISHER

By Caswell & Lagaard
ATTORNEYS

Nov. 3, 1953 J. M. SHERMAN ET AL 2,658,103

TELEVISION APPARATUS

Filed April 6, 1951 3 Sheets-Sheet 3

Inventors
JOHN M. SHERMAN
AND
EDWILL FISHER

By Caswell & Lagaard
ATTORNEYS

Patented Nov. 3, 1953

2,658,103

UNITED STATES PATENT OFFICE 2,658,103

TELEVISION APPARATUS

John M. Sherman and Ed Will Fisher, Minneapolis, Minn., assignors of one-third to Mid-Continent Radio-Television, Incorporated Application April 6, 1951, Serial No. 219,634

15 Claims. (Cl. 178—5.2)

The herein disclosed invention relates to television apparatus and particularly to apparatus for producing color pictures and has for an object to provide apparatus which is simple in construction, positive in action and which can be built at a reasonable cost.

Another object of the invention resides in providing television apparatus for producing color pictures in which the system now in general use may be employed and in which the apparatus of both the transmitter and receiver may be utilized with but slight modifications.

A still further object of the invention resides in providing a translocating device adapted to be applied to the camera or other device to which the image is directed and which forms a plurality of images arranged in successive order and in further utilizing color filters associated with the light rays forming each image.

An object of the invention resides in providing the translocating device with a lens and in utilizing a plurality of sets of reflectors each set reflecting light rays from a portion of the lens and along different light paths and directing the images of the object to the focal plane of the lens.

Another object of the invention resides in arranging the reflectors so that the mean length of the light rays forming each image is the same length and so that the images are arranged on the focal plane in successive order.

An object of the invention resides in providing a television transmitter having a camera tube formed with an active surface and in arranging said surfaces substantially at the focal plane of the lens of the translocating device, and in further providing the tube with deflecting coils arranged to produce scanning successively across the images and in the same direction with respect to the subject matter of each image.

A still further object of the invention resides in providing a television receiver energized by the energy emanating from the transmitter and having a picture tube provided with an active surface and on which images corresponding with those projected on the active surface of the camera tube are produced and in providing deflecting means associated with the tube and adapted to produce scanning to correspond with the scanning occurring at the camera tube.

An object of the invention resides in providing a superimposing device associated with the picture tube of the receiver and having a lens with a plurality of sets of reflectors and constructed similar to said transposing device but operating in reverse to collect the images from said picture tube and to superimpose them in said lens, and in further providing a projection screen on which the superimposed images leaving the lens may be projected.

Other objects of the invention reside in the novel combination and arrangement of parts and in the details of construction hereinafter illustrated and/or described.

Figure 1:
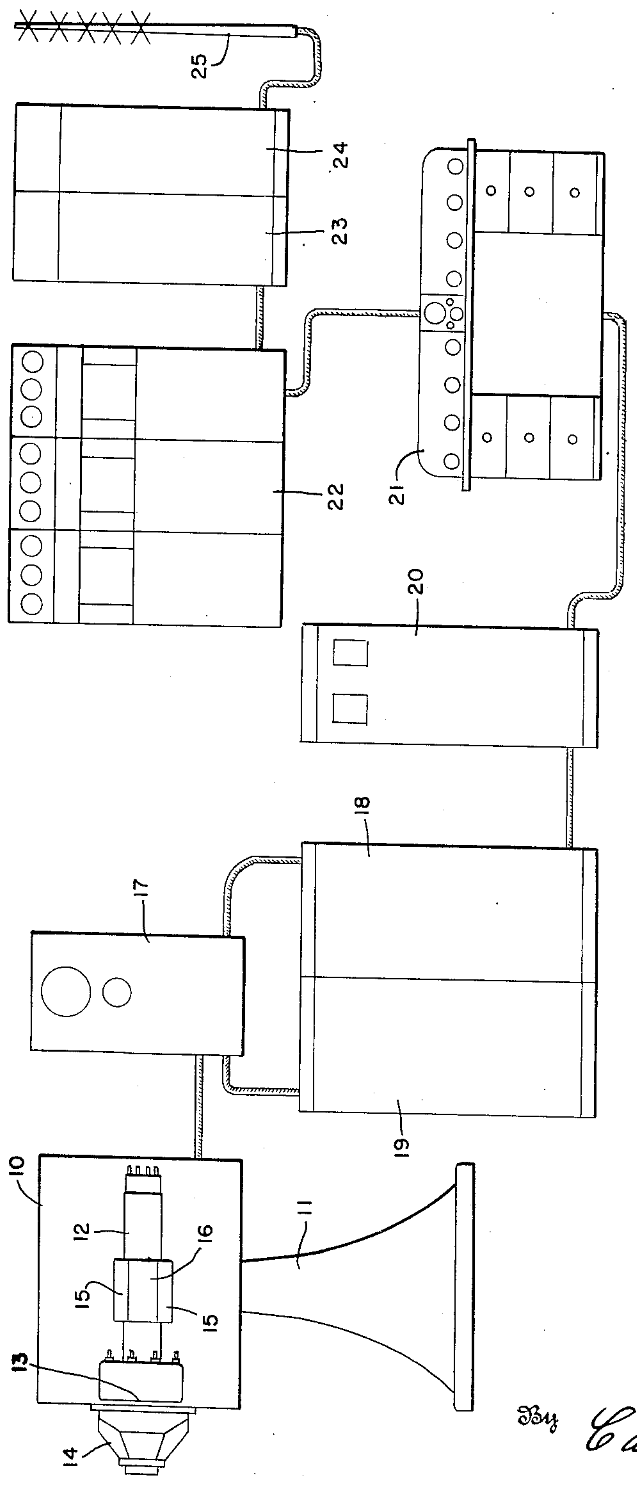
Fig. 1 is a diagrammatic view of a television transmitter illustrating an embodiment of the invention.

The structure shown in the drawings consists of television apparatus having a standard television transmitter provided with a camera tube and deflecting means for producing scanning in a certain manner. The apparatus further includes a standard receiver provided with a picture tube and deflecting means for producing scanning in the same manner as with the camera tube. Associated with the camera tube is a translocating device which includes a lens and a plurality of sets of reflectors each adapted to intercept a portion of the light rays passing through the lens. Each set of reflectors collects a full image and transmits the same along separate paths and toward the focal plane. The translocating device is so situated that the active surface of the camera tube is disposed substantially at the focal plane of the lens. The reflectors are arranged so that the images are disposed in successive order and in the embodiment shown in a column. In such case the scanning takes place crosswise of the column beginning at the top and progressing downwardly and successively scanning the images from top to bottom. In the light paths produced by the deflectors are color screens which pass certain light rays and reject the others. In the embodiment illustrated the upper filter is red, the middle green and the lower blue. The intelligence thus obtained is transmitted through space in the customary manner and a plurality of images produced on the active surface of the receiver picture tube in the same relation to one another as the images on the active surface of the camera tube. A superimposing device is used in conjunction with the picture tube of the receiver. This device is constructed the same as the transposing device excepting in reverse with a lens and sets of reflectors arranged to converge the rays from the images on the receiver picture tube and superimpose them in the lens. The active surface of the picture tube is disposed substantially at the focal plane of the lens. Beyond the lens is a projection screen on which the composite picture formed in the lens is projected and which is readily viewed by the spectator. This picture appears in natural colors.

The invention is shown diagrammatically in Fig. 1 and utilizes a standard television transmitter. In the drawings the camera is indicated at 10 and may be of usual construction mounted on a pedestal 11. This camera includes a camera tube 12 having an active surface 13 at the forward portion of the same. With the instant invention the usual lens supplied with the camera may be omitted and a translocating device 14, constituting a feature of the invention, applied thereto. Or, if desired, the lens may be retained and the translocating device modified to operate in conjunction with the camera lens. The tube 13 is provided with deflecting coils 15 and 16 which serve the usual purpose and produce scanning of the light point at the active surface 13 of the tube. The camera 10 is connected to a camera control 17 which in turn is connected to a power supply 18 and a sync generator 19. These latter feed suitable amplifiers 20 which are connected to a transmitter control 21. The transmitter control is connected to a picture transmitter 22 which in turn is connected to a side band filter 23 and a diplexer 24. The diplexer 24 is connected to a transmitting antenna 25. With the exception of the translocating device 14 and the modification of the camera 10 to adapt the translocating device to the camera, the equipment so far described is conventional and apparatus as is now well-known in the art and in present day use may be employed for the purpose. For this reason the construction and operation of such parts has not been disclosed in detail in this application.

Figure 2:
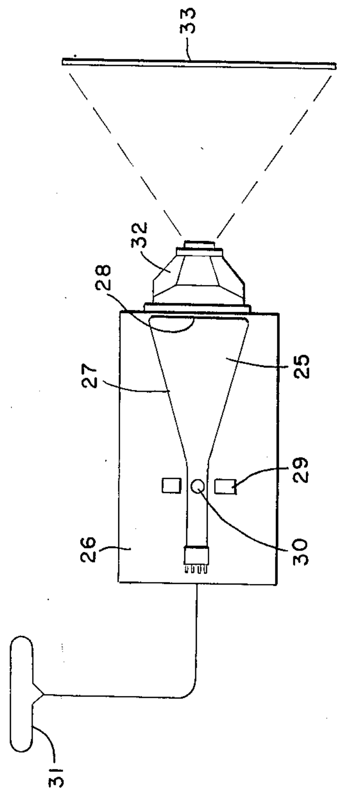
Fig. 2 is a diagrammatic view of a television receiver illustrating an embodiment of the invention.

The receiver of the invention comprises a standard receiver 26 which includes a picture tube 27 having an active surface 28. This tube is provided with deflecting coils 29 and 30 by means of which the light point impinging on the surface 28 is scanned with reference to said surface. In Figs. 1 and 2 both the camera 10 and the receiver 24 are shown in elevation and the scanning is procured transversely in a horizontal direction progressing from top to bottom of the tube in the customary manner. The receiver 26 is connected to a television receiving antenna 31. Associated with the active surface 28 of the tube 27 is a superimposing device 32 which projects the image on a projection screen 33.

The translocating device 14 and the superimposing device 32 are identical in construction except that the superimposing device is used in reverse as compared to the translocating device. Due to the similarity of parts only the translocating device 14 will be described in detail.

Figures 3, 4, 5, 6:
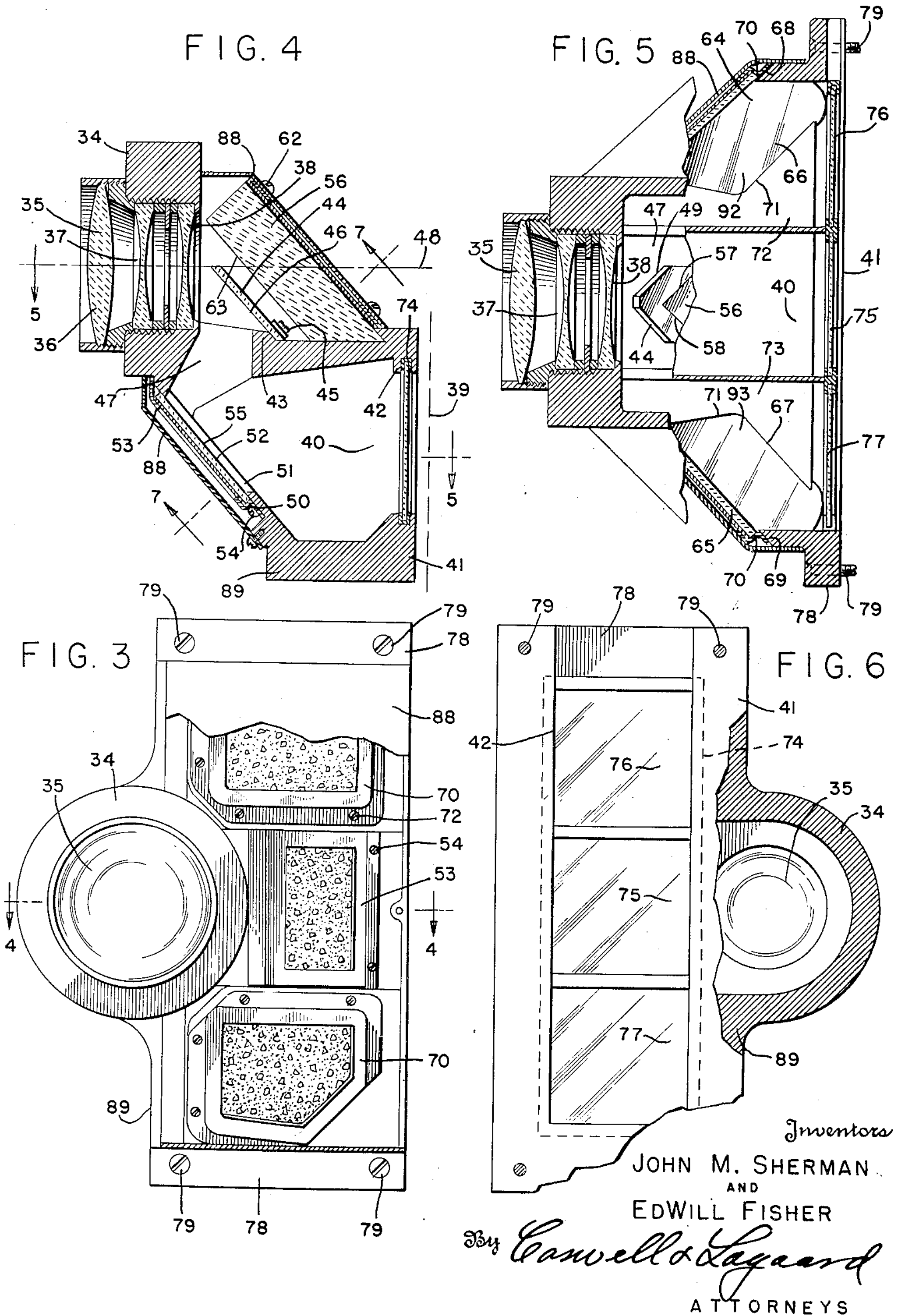
Fig. 3 is a front elevational view of a transposing device constituting a portion of the invention.
Fig. 4 is a plan sectional view of the structure shown in Fig. 3 and taken on line 4—4 of Fig. 3.
Fig. 5 is a plan sectional view taken on line 5—5 of Fig. 4.
Fig. 6 is a rear elevational view of the structure shown in Fig. 3 with portions broken away to illustrate the lens structure of the device.

The translocating device 14 is shown in detail in Figs. 3, 4 and 5 and consists of a cast body 89. This body has a lens holder 34 formed in the same in which is disposed a lens 35. Lens 35 may be of any type such as is now used in cameras and optical devices and may consist of various elements 36, 37 and 38 assembled for the purpose of increasing the amount of light entering the lens, and correcting astigmatism and other undesirable lens characteristics. The lens 35 shown focuses at a focal plane indicated by the dotted line 39 in Fig. 3. The body 89 is formed with a chamber 40 into which light rays entering the lens 35 may be carried and brought to the focal plane 39. The body 89 has a surface 41 disposed in proximity to and parallel with the focal plane 39. This surface has an opening 42 rectangular in form as best disclosed in Fig. 6 and which is arranged with its long side vertical. This opening communicates with the chamber 40. Mounted on a lug 43 formed on the body 89 is a reflector 44 which is attached to said lug by means of screws 45. This reflector has a reflecting surface 46 as best shown in Fig. 4 and which is adapted to direct light rays impinging thereon through a passageway 47 in the body 89 and communicating with the chamber 40. The reflector 44 is disposed at an angle with respect to the axis 48 of lens 35 and the end of said reflector is V-shaped in form as indicated at 49 in Fig. 5. By means of this construction approximately one-third of the light entering the lens 35 is reflected by said reflecting surface 46 and directed along the passageway 47 which would be toward the right when viewing the translocating device from the front of the lens 35. The body 89 has a surface 50 cut at an angle and extending in the same general direction as the surface 46 of the reflector 44. The said body has an opening 51 in the same through the surface 50 and which communicates with the chamber 40 and the passageway 47. The surface 50 forms a ledge on which is disposed a reflector 52 which is held in position on said ledge by means of a reflector holder 53 secured to the body 33 by means of screws 54. The reflector 52 has a reflecting surface 55 which receives light reflected by the surface 46 of reflector 44 and reflects it toward the focal plane 39 and to the central area of the same as viewed in Fig. 6. The reflector 44 serves as a primary reflector and the reflector 52 as a secondary reflector which translocate the rays of light entering the lens 35 to the location referred to.

Associated with the lens 35 is another reflector 56 which is triangular in cross section and which has two angularly disposed reflecting surfaces 57 and 58. The said reflector fits in a V-shaped socket 59 formed in the body 89. This reflector is held in position by means of a reflector holder 60 which overlies the rearward portion 61 of said reflector and is attached to the body 33 by means of screws 62. The reflector 56 is so situated that the edge 63 of the same formed by the intersection of the surfaces 57 and 58 lies at an angle with reference to the axis 48 of the lens 35 and substantially parallel with the plane of the surface 46 of reflector 44. The angle between the surfaces 57 and 58 is such that the said two surfaces each reflect one-third of the light passing through the lens 35 while the remainder is reflected by the reflector 44. The light impinging upon the surfaces 56 and 57 is reflected outwardly similar to the light striking the surface 46 of reflector 44 and is directed toward secondary reflectors 64 and 65 which are mounted and supported similarly to the reflector 52. These reflectors have reflecting surfaces 66 and 67 which direct the light impinging thereon toward the focal plane 39. By the arrangement of the reflectors as shown the surfaces 66 and 67 reflect the light towards areas of the focal plane situated above and below the central area of the same. The reflectors 64 and 65 rest on surfaces 68 and 69 formed on the body 89 and which form ledges on which the reflectors 64 and 65 rest. Suitable reflector holders 70 attached to the said body by means of screws 72 hold these reflectors in position. The surfaces 68 and 69 have openings 71 in the same and which communicate with passageways 92 and 93 in the body 89. These passageways are directed toward the focal plane 39. The body 89 has grooves 74 formed in the same in which are mounted three color filters 75, 76 and 77. The light rays forming the three images cast by the three respective sets of reflectors pass through these filters and are projected on the focal plane. The filter 76 is a red filter, the filter 75 a green filter and the filter 77 a blue filter. The body 89 is formed with flanges 78 extending about the same and which overlie the front of the camera 10. The said device is attached to the camera proper by means of screws 79 which extend through said flange and are screwed into the camera case. The parts are so located that the focal plane 39 of the translocating device falls on the active surface 13 of the tube 12. The focus of the device may be adjusted by moving the tube in an axial direction in the customary manner. Attached to the body 89 are covers 88 which protect the various reflectors of the device.

Figure 8:
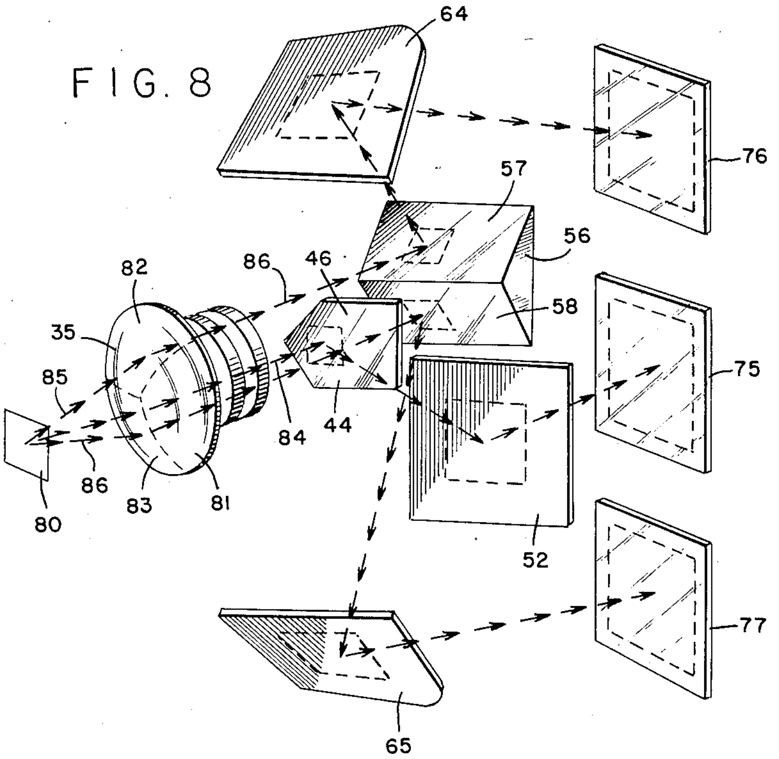
Fig. 8 is a diagrammatic exploded view showing the location of the various reflectors with relation to the lens and the color filters.
Figure 7:
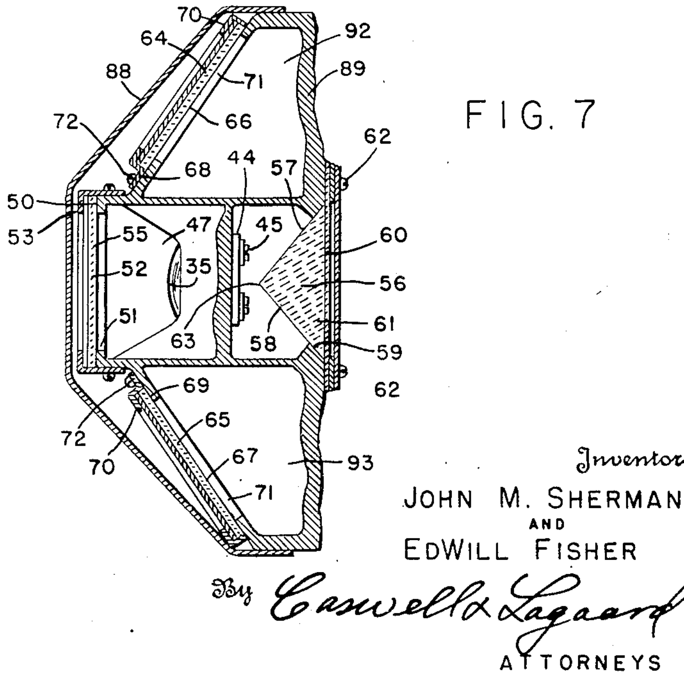
Fig. 7 is a cross-sectional view taken on line 7—7 of Fig. 4.

The operation of the invention is as follows and can best be explained by reference to Fig. 8: In this view the supports for the various reflectors and the lens have been omitted and the parts have been separated to illustrate the travel of the rays of light from the object to the focal plane. In Fig. 8 a square object 80 is shown in front of the lens 35. The rays of light reflected by the object to the lens pass through the three segments of the lens indicated at 81, 82 and 83. For convenience and to eliminate confusion only the mean ray for each segment of the lens has been shown. These rays are designated by the numerals 84, 85 and 86. It will be noted that ray 84 passes through the segment 81 of the lens, strikes the surface 46 of reflector 44 and is reflected to reflector 52. This ray is reflected by the reflecting surface 55 of reflector 52 to the focal plane and reaches the filter 75. The ray 85 strikes the surface 57 of the reflector 56 and is directed to the reflector 64. From this reflector the ray travels to the filter 76 and in a similar manner the ray 86 strikes surface 58 of reflector 56, is reflected to the reflector 65 and from this reflector travels to the filter 77. It will be noticed that the images on these filters are shown closely positioned one above the other and the base of each image is parallel to the base of the others. The reflectors are located in the transposing device so that the lengths of mean rays of the groups of reflectors from the lens to the screens are exactly equal. This is procured by having the images disposed to one side of the vertical median plane of the lens. By so arranging the parts each image is the same size and when the images are again combined the composite picture is a true representation of the object. The rays on leaving the filters 75, 76 and 77 contain only the desired pigment colors and the intensity of the light through said filters varies in accordance with the depth of the color transmitted. Since the focal plane is at the active surface 13 of the tube 12 the image is projected on said surface in accordance with the amount of light passing through each filter. The scanning takes place on the active surface 13 of the tube 12 crosswise of the tube and progresses from the top downwardly to the bottom. By this means the images from the three filters 75, 76 and 77 are successively scanned and the result transmitted through the transmitting equipment of the transmitter to the antenna 23. When the intelligence is picked up by the receiver, scanning on the receiver produces the three images on the active surface 28 of the picture tube 27, each image being modified in accordance with the amount of filtered color having passed through the filters 75, 76 and 77. The superimposing device 32 receives the images from the active surface 28 of the receiver tube and operates in exact reverse from the translocating device 14. The rays passing through the filters of this device are reflected by the reflectors and superimposed one upon the other in the lens. Upon emerging from the lens the rays strike the projection screen 31 and exhibit thereon color pictures corresponding with the object viewed.

For the sake of simplicity the images have been shown as square in the drawings. It can readily be comprehended that any aspect ratio may be employed and the conventional 4–3 aspect ratio used. In such case the aspect ratio of the tube would be 4–9 if camera and picture tubes with rectangular active surfaces were employed.

The advantages of the invention are manifest. The system may be used with existing television apparatus and only minor changes or alterations thereof need be made. The device gives a true picture of the object taken and in colors corresponding with the colors of the filters employed. By superimposing the images formed by the system the spacing of the horizontal lines by the scanning of the pictures with the same tube is largely overcome by the diffusing effect procured by the superimposing of colored images one upon the other. The invention can be constructed at a very reasonable cost. By utilizing a single lens and by employing superimposing devices and translocating devices exactly the same the said devices may be constructed with less precision than would be required were several lenses employed for the same purpose.

Changes in the specific form of the invention, as herein described, may be made within the scope of what is claimed without departing from the spirit of the invention.

Having described the invention, what is claimed as new and desired to be protected by Letters Patent is:

1. In television apparatus for producing color pictures, a translocating device including a lens, reflectors arranged to direct light rays entering the lens along a plurality of light paths and toward the focal plane, said reflectors serving to produce a plurality of images at the focal plane disposed in successive order, color screens in the respective light paths, a television transmitter including a camera tube having its active surface disposed substantially at the focal plane of the lens and on which all of the images are projected, deflecting coils associated with said tube and producing scanning successively across the images and in the same direction with respect to the subject matter of each image, a television receiver actuated by the energy emanating from said television transmitter and having a picture tube, deflecting coils associated with said tube and scanning in the same manner as the deflecting coils of said camera tube to produce a plurality of images at the active surface of the picture tube and corresponding with the images on the active surface of the camera tube, a superimposing device including a lens and a number of reflectors arranged to direct light rays impinging on the reflectors along a plurality of paths converging towards the lens, color screens in the respective light paths, said superimposing device being disposed with the focal plane of the lens substantially at the active surface of the picture tube and with the light rays from all of the images reaching the lens to cause superimposition of the images one upon the other and a projection screen upon which the superimposed images are projected.

2. In television apparatus for producing color pictures, a translocating device including a lens, reflectors arranged to direct light rays entering the lens along a plurality of light paths and toward the focal plane, said reflectors serving to produce a plurality of images at the focal plane disposed in successive order in a vertical column, color screens in the respective light paths, a television transmitter including a camera tube having its active surface disposed substantially at the focal plane of the lens and on which all of the images are projected in the same order, deflecting coils associated with said tube and producing scanning across the images and successively from the upper image downwardly through the others, a television receiver actuated by the energy emanating from said television transmitter and having a picture tube, deflecting coils associated with said tube and scanning in the same manner as the deflecting coils of said camera tube to produce a plurality of images at the active surface of the picture tube and corresponding with the images on the active surface of the camera tube, a superimposing device including a lens and a number of reflectors arranged to direct light rays impinging on the reflectors along a plurality of paths converging towards the lens, color screens in the respective light paths, said superimposing device being disposed with the focal plane of the lens substantially at the active surface of the picture tube and with the light rays from all of the images reaching the lens to cause superimposition of the images one upon the other and a projection screen upon which the superimposed images are projected.

3. In television apparatus for producing color pictures, a translocating device including a lens, reflectors arranged to direct light rays entering the lens along a plurality of light paths and toward the focal plane, said reflectors serving to produce at the focal plane a plurality of images substantially rectangular in form with one of the edges of each image lying adjacent an edge of another image, color screens in the respective light paths, a television transmitter including a camera tube having its active surface disposed substantially at the focal plane of the lens and on which all of the images are projected, deflecting coils associated with said tube and producing scanning across the images, a television receiver actuated by the energy emanating from said television transmitter and having a picture tube, deflecting coils associated with said tube and scanning in the same manner as the deflecting coils of said camera tube to produce a plurality of images at the active surface of the picture tube and corresponding with the images on the active surface of the camera tube, a superimposing device including a lens and a number of reflectors arranged to direct light rays impinging on the reflectors along a plurality of paths converging towards the lens, color screens in the respective light paths, said superimposing device being disposed with the focal plane of the lens substantially at the active surface of the picture tube and with the light rays from all of the images reaching the lens to cause superimposition of the images one upon the other and a projection screen upon which the superimposed images are projected.

4. In television apparatus for producing color pictures, a translocating device including a lens, a plurality of primary reflectors each arranged to reflect a portion of the light rays passing through the lens in directions away from the axis of the lens, a corresponding number of secondary reflectors receiving the light rays reflected by the primary reflectors and directing them toward the focal plane along different paths and forming separate images at the focal plane, separate color screens in said light paths, a television transmitter including a camera tube having its active surface disposed substantially at the focal plane of the lens and on which all of the images are projected, deflecting coils associated with said tube and producing scanning successively across the images and in the same direction with respect to the subject matter of each image, a television receiver actuated by the energy emanating from said television transmitter and having a picture tube, deflecting coils associated with said tube and scanning in the same manner as the deflecting coils of said camera tube to produce a plurality of images at the active surface of the receiver tube and corresponding with the images on the active surface of the camera tube, a superimposing device including a lens and a number of reflectors arranged to direct light rays impinging on the reflectors along a plurality of paths converging towards the lens, color screens in the respective light paths, said superimposing device being disposed with the focal plane of the lens substantially at the active surface of the receiver tube and with the light rays from all of the images reaching the lens to cause superimposition of the images one upon the other and a projection screen upon which the superimposed images are projected.

5. In television apparatus for producing color pictures, a translocating device including a lens, a plurality of primary reflectors each arranged to reflect a portion of the light rays passing through the lens in directions away from the axis of the lens, a corresponding number of secondary reflectors receiving the light rays reflected by the primary reflectors and directing them toward the focal plane along different paths and forming separate images at the focal plane, the mean length of each of said paths being equal, separate color screens in said light paths, a television transmitter including a camera tube having its active surface disposed substantially at the focal plane of the lens and on which all of the images are projected, deflecting coils associated with said tube and producing scanning successively across the images and in the same direction with respect to the subject matter of each image, a television receiver actuated by the energy emanating from said television transmitter and having a picture tube, deflecting coils associated with said tube and scanning in the same manner as the deflecting coils of said camera tube to produce a plurality of images at the active surface of the receiver tube and corresponding with the images on the active surface of the camera tube, a superimposing device including a lens and a number of reflectors arranged to direct light rays impinging on the reflectors along a plurality of paths converging towards the lens, color screens in the respective light paths, said superimposing device being disposed with the focal plane of the lens substantially at the active surface of the receiver tube and with the light rays from all of the images reaching the lens to cause superimposition of the images one upon the other and a projection screen upon which the superimposed images are projected.

6. In television apparatus for producing color pictures, a translocating device including a lens, three sets of reflectors arranged to direct light rays entering the lens along three separate paths toward the focal plane with the images each in the form of a rectangle having an aspect ratio other than one with the longer side horizontal and with the images disposed in a vertical column and with the horizontal edges of the intermediate image adjacent the facing edges of the other images, color screens in said light paths, a television transmitter including a camera tube having its active surface disposed substantially at the focal plane of the lens and on which all of the images are projected, deflecting coils associated with said tube and producing scanning successively across the images from the top of the upper image downwardly and successively through the images, a television receiver actuated by the energy emanating from said television transmitter and having a picture tube, deflecting coils associated with said tube and scanning in the same manner as the deflecting coils of said camera tube to produce a plurality of images at the active surface of the receiver tube and corresponding with the images on the active surface of the transmitter tube, a superimposing device including a lens and a number of reflectors arranged to direct light rays impinging on the reflectors along a plurality of paths converging towards the lens, color screens in the respective light paths, said superimposing device being disposed with the focal plane of the lens substantially at the active surface of the picture tube and with the light rays from all of the images reaching the lens to cause superimposition of the images one upon the other and a projection screen upon which the superimposed images are projected.

7. In combination with a picture tube having an active surface a superimposing device including a single lens, a plurality of sets of reflectors arranged to direct light rays impinging on said reflectors along a plurality of paths converging toward the lens, color screens in the respective light paths, said lens being disposed with its focal plane substantially at the active surface of the tube to cause superimposition in the lens of the images occurring at the active surface of the picture tube and a projection screen upon which the superimposed images are projected.

8. In combination with a video camera tube having an active surface, a translocating device including a single lens, a plurality of sets of reflectors arranged to direct light rays entering the lens along a plurality of light paths toward the focal plane, said reflectors serving to produce a plurality of images at the focal plane disposed in successive order color screens in said light paths, the active surface of said camera tube being disposed substantially at the focal plane of the lens and on which all of the images are projected and deflecting coils associated with said tube and producing scanning successively across the images and in the same direction with respect to the subject matter of each image.

9. In television apparatus for producing color pictures, a translocating device including a single lens, reflectors arranged to direct light rays entering the lens along a plurality of light paths and toward the focal plane, said reflectors serving to produce at the focal plane a plurality of images substantially rectangular in form with one of the edges of each image lying adjacent an edge of another image, color screens in the respective light paths, a television transmitter including a camera tube having its active surface disposed substantially at the focal plane of the lens and on which all of the images are projected, deflecting coils associated with said tube and producing scanning across the images and a television receiver actuated by the energy emanating from said television transmitter.

10. In television apparatus for producing color pictures, a translocating device including a single lens, a plurality of primary reflectors each arranged to reflect a portion of the light rays passing through the lens in directions away from the axis of the lens, a corresponding number of secondary reflectors receiving the light rays reflected by the primary reflectors and directing them toward the focal plane along different paths and forming separate images at the focal plane, the mean length of each of said paths being equal, separate color screens in said light paths, a television transmitter including a camera tube having its active surface disposed substantially at the focal plane of the lens and on which all of the images are projected, deflecting coils associated with said tube and producing scanning successively across the images and in the same direction with respect to the subject matter of each image and a television receiver actuated by the energy emanating from said television transmitter.

11. In television apparatus for producing color pictures, a translocating device including a single lens, three sets of reflectors arranged to direct light rays entering the lens along three separate paths toward the focal plane with the images each in the form of a rectangle having an aspect ratio other than one with the longer side horizontal and with the images disposed in a vertical column and with the horizontal edges of the intermediate image adjacent the facing horizontal edges of the other images, color screens in said light paths, a television transmitter including a camera tube having its active surface disposed substantially at the focal plane of the lens and on which all of the images are projected, deflecting coils associated with said tube and producing scanning successively across the images from the top of the upper image downwardly and successively through the images and a television receiver actuated by the energy emanating from said television transmitter.

12. In television apparatus for producing color pictures, a translocating device including a single lens, a plurality of primary reflectors each arranged to reflect a portion of the light rays passing through the lens in directions away from the axis of the lens, a corresponding number of secondary reflectors and directing them toward the focal plane along different paths and forming separate images at the focal plane, the mean length of each of said paths being equal, separate color screens in said light paths and a television transmitter including a camera tube having its active surface disposed substantially at the focal plane of the lens and on which all of the images are projected and deflecting coils associated with said tube and producing scanning successively across the images and in the same direction with respect to the subject matter of each image.

13. In television apparatus for producing color pictures, a translocating device including a single lens, three sets of reflectors arranged to direct light rays entering the lens along three separate paths toward the focal plane with the images each in the form of a rectangle having an aspect ratio other than one with the longer edge horizontal and with the images disposed in a vertical column and with the horizontal edges of the intermediate image adjacent the facing horizontal edges of the other images and with the upper and lower images having upper and lower outer edges, color screens in said light paths and a television transmitter including a camera tube having its active surface disposed substantally at the focal plane of the lens and on whch all of the images are projected and deflecting coils associated with said tube and producing scanning successively across the images from one outer horizontal edge and successively through the images to the other outer horizontal edge, the scanning length of all images being substantially equal to the longer dimension of each image.

14. In television apparatus for producing color pictures, a translocating device including a single lens, three sets of reflectors arranged to direct light rays entering the lens along three separate paths toward the focal plane with the images each in the form of a rectangle having an aspect ratio of 4 to 3 with the longer edge horizontal and with the images disposed in a vertical column and with the horizontal edges of the intermediate image adjacent the facing horizontal edges of the other images to give the combined images on the picture tube an aspect ratio of 4 to 9, the upper and lower edges of the upper and lower images forming the outer horizontal edges of the combined images, color screens in said light paths and a television transmitter including a camera tube having its active surface disposed substantially at the focal plane of the lens and on which all of the images are projected and deflecting coils associated with said tube and producing scanning successively across the images from one outer horizontal edge and successively through the images to the other outer horizontal edge, the scanning length of all images being substantially equal to the longer dimension of each image.

15. In television apparatus for producing color pictures, a translocating device producing three contiguous rectangular images arranged in alignment, said device including a lens, reflectors mounted in back of the lens and having three surfaces extending at an angle with respect to the axis of the lens and each adapted to reflect the rays passing through substantially equal segmental shaped portions of the lens, two of said surfaces intersecting along a line extending in the same general direction as the third surface but spaced therefrom, another reflector having a surface substantially parallel to the third reflecting surface, the extension of which intersects the plane in which the images lie along a line parallel to the direction of alignment of the images, another reflector having a reflecting surface substantially parallel to one of said first named surfaces the extension of which intersects the plane in which the images lie along a line extending in the same general direction as the diagonal of one of the outer images, and another reflector having a reflecting surface substantially parallel to the other of said first named reflecting surfaces, the extension of which intersects the plane in which the images lie along a line extending in the same general direction as the opposite diagonal other outer image and color filters arranged in the light paths between the lens and the images.

JOHN M. SHERMAN.
ED WILL FISHER.

References Cited in the file of this patent

UNITED STATES PATENTS

| Number | Name | Date |
|---|---|---|
| 2,389,646 | Sleeper | Nov. 27, 1945 |
| 2,465,652 | Legler | Mar. 29, 1949 |
| 2,603,706 | Sleeper | July 15, 1952 |